United States Patent
Bui et al.

(10) Patent No.: US 11,830,270 B1
(45) Date of Patent: Nov. 28, 2023

(54) MACHINE LEARNING SYSTEMS FOR AUTO-SPLITTING AND CLASSIFYING DOCUMENTS

(71) Applicant: FPT USA Corp., Richardson, TX (US)

(72) Inventors: Giap Dinh Bui, Ha Tinh (VN); An Sy Nguyen, Nghe An (VN); Dat Quoc Dao, Thai Binh (VN)

(73) Assignee: FPT USA Corp., Richardson, TX (US)

( * ) Notice: Subject to any disclaimer, the term of this patent is extended or adjusted under 35 U.S.C. 154(b) by 0 days.

(21) Appl. No.: 18/137,077

(22) Filed: Apr. 20, 2023

(51) Int. Cl.
| | |
|---|---|
| *G06V 30/413* | (2022.01) |
| *G06V 10/82* | (2022.01) |
| *G06V 30/10* | (2022.01) |
| *G06V 30/416* | (2022.01) |

(52) U.S. Cl.
CPC ............ *G06V 30/413* (2022.01); *G06V 10/82* (2022.01); *G06V 30/10* (2022.01); *G06V 30/416* (2022.01)

(58) Field of Classification Search
CPC ...... G06V 30/413; G06V 10/82; G06V 30/10; G06V 30/416
See application file for complete search history.

(56) References Cited

U.S. PATENT DOCUMENTS

| | | | | |
|---|---|---|---|---|
| 6,072,941 A | * | 6/2000 | Suzuki .................... | G06T 11/60 358/1.11 |
| 10,395,772 B1 | * | 8/2019 | Lucas ................. | G06F 18/2431 |
| 10,896,357 B1 | * | 1/2021 | Corcoran .............. | G06F 18/217 |
| 10,922,358 B2 | | 2/2021 | Garg et al. ..................... | 707/737 |
| 10,963,692 B1 | * | 3/2021 | Corcoran .............. | G06V 30/414 |
| 2006/0088214 A1 | * | 4/2006 | Handley .............. | G06V 30/416 382/176 |
| 2007/0217691 A1 | * | 9/2007 | Newcomer .......... | G06V 30/416 382/229 |
| 2015/0161129 A1 | * | 6/2015 | Miller ..................... | G06F 16/40 707/728 |
| 2019/0294874 A1 | * | 9/2019 | Orlov ..................... | G06N 3/084 |
| 2020/0034611 A1 | * | 1/2020 | Hosabettu ............ | G06V 30/414 |
| 2020/0160050 A1 | * | 5/2020 | Bhotika ................ | G06V 30/414 |
| 2020/0193209 A1 | * | 6/2020 | Basa-Martinez ...... | G06V 20/63 |

(Continued)

OTHER PUBLICATIONS

Lulu Wan, George Papageorgiou, Michael Seddon, Mirko Bernardoni, *Long-length Legal Document Classification*.

(Continued)

*Primary Examiner* — Xuemei G Chen (57) ABSTRACT

A computer-implemented method for auto-splitting and classifying an input document into one or more sub-documents using a machine learning system is described. The machine learning system includes a visual splitting neural network, an optical character recognition sub-system, a title classifier, a document classifier, and a grouper sub-system. The method includes: receiving a visual input representing a plurality of pages of the input document; classifying, using the visual splitting neural network, each page of the input document into a respective template of a plurality of templates; for each page of the input document, determining a final document type that the page belongs to; and grouping, using a grouper sub-system, the plurality of pages of the input document into one or more sub-documents based on (i) the respective template of each page and (ii) the respective final document type that each page belongs to.

20 Claims, 6 Drawing Sheets

(56) References Cited

U.S. PATENT DOCUMENTS

| | | | |
|---|---|---|---|
| 2020/0320165 A1* | 10/2020 | Srinivasan | G06V 30/414 |
| 2021/0034853 A1* | 2/2021 | Matsumoto | G06V 30/413 |
| 2021/0192129 A1* | 6/2021 | Garg | G06F 40/174 |
| 2021/0209356 A1* | 7/2021 | Wang | G06F 18/213 |
| 2021/0319179 A1 | 10/2021 | Muffat | 704/9 |
| 2021/0383106 A1* | 12/2021 | Maggio | G06F 18/2431 |
| 2022/0100964 A1 | 3/2022 | Talwadker et al. | 704/9 |
| 2022/0130163 A1* | 4/2022 | Kumar | G06F 16/93 |
| 2022/0292862 A1 | 9/2022 | Sundell et al. | 382/176 |
| 2022/0309813 A1* | 9/2022 | Melchy | G06N 3/045 |
| 2023/0015846 A1* | 1/2023 | Toffey | G06V 30/42 |
| 2023/0074788 A1* | 3/2023 | Li | G06F 16/90344 |
| 2023/0177251 A1* | 6/2023 | Kim | G06F 16/3323 715/243 |

OTHER PUBLICATIONS

Alexios Gidiotis, Grigorios Tsoumakas, *A Divide-and-Conquer Approach to the Summarization of Long Documents*.

Floriana Esposito, Stefano Ferilli, Teresa M.A. Basile, and Nicola Di Mauro, *Machine Learning for Digital Document Processing: from Layout Analysis to Metadata Extraction*.

* cited by examiner

MACHINE LEARNING SYSTEMS FOR AUTO-SPLITTING AND CLASSIFYING DOCUMENTS

BACKGROUND

This disclosure generally relates to the field of document processing, specifically to machine learning systems for auto-splitting and classifying documents.

In today's digital age, large volumes of documents are generated and managed by organizations and individuals on a daily basis. These includes, for example, contracts, invoices, legal documents, financial documents and other important documents that are critical to the functioning of organizations. Managing and processing these documents can be time-consuming and labor-intensive. In addition, the manual process can introduce the risk of errors and inconsistencies that can impact the accuracy and reliability of the information stored.

SUMMARY

In general, one innovative aspect of the subject matter described in this specification can be embodied in a computer-implemented method for auto-splitting and classifying an input document into one or more sub-documents using a machine learning system. The input document includes multiple pages. The machine learning system includes a visual splitting neural network, an optical character recognition sub-system, a title classifier, a document classifier, and a grouper sub-system. The method includes:
  receiving a visual input representing the plurality of pages of the input document;
  classifying, using the visual splitting neural network, each page of the input document into a respective template of a plurality of templates;
  for each page of the input document, performing the following operations:
    generating, using the optical character recognition sub-system, a set of text lines from text content of the page,
    processing, using the title classifier, each text line in the set of text lines to generate a corresponding confidence score that represents a probability that the text line comprises a title of the page,
    selecting, based on the confidence scores of the set of text lines, a text line having a highest confidence score,
    determining whether the highest confidence score exceeds a threshold,
    in response to determining that the highest confidence score exceeds the threshold, processing, using the document classifier, the selected text line to generate a respective document score for each of a plurality of document types, with each respective document score representing a probability that the page belongs to the document type, and
    selecting the document type with a highest document score as a final document type that the page belongs to; and
  grouping, using a grouper sub-system, the plurality of pages of the input document into one or more sub-documents based on (i) the respective template of each page and (ii) the respective final document type that each page belongs to.
In some implementations, the machine learning system further includes an identification extraction neural network.

In these implementations, the method includes, for each page of the input document and in response to determining that the highest confidence score does not exceed the threshold, processing, using the identification extraction neural network, each text line in the set of text lines to identify an identification number of the page. In these implementations, grouping, using the grouper sub-system, the plurality of pages of the input document into the one or more sub-documents is further based on the identification number of the page.

Other embodiments of this aspect include corresponding systems, apparatuses, and computer programs, configured to perform the operations of the methods, encoded on computer storage devices.

The subject matter described in this specification can be implemented in particular embodiments so as to realize one or more of the following technical advantages.

Improved Accuracy: The described system takes into account both visual and textual features of a document, thus obtaining a better performance in document processing tasks in comparison to existing systems. In particular, by using a specific combination of a visual splitting neural network, a title classifier, a document classifier, and optionally, an identification extraction neural network to process both visual and textual features of a document, the machine learning system described in this specification can identify the template, document type and identification number (if any) of each page. Using the identified information, the described system can split the document into one or more sub-documents with higher accuracy compared to existing systems. This results in a more streamlined, more efficient and more effective document processing system.
  Scalability: The described machine learning system can handle a large volume of documents in a short period of time, making it suitable for use in organizations that have to process a large number of documents on a daily basis. For example, the described system can process hundreds or thousands of documents in minutes. Such task cannot be performed manually by human.
  Improved Speed: With the use of a visual splitting neural network, a title classifier, a document classifier, and optionally, an identification extraction neural network, the described system can process documents faster compared to existing document processing systems, thus saving organizations a significant amount of time and resources.
  Robustness and Customizability: The machine learning system is designed and trained to be robust to changes in document format, layout, and style. This means that it can still perform accurately even if the format of the document changes over time. In addition, the use of multiple templates and document types allows the machine learning system to learn and adapt to meet specific needs of the organization.
  Improved Data Quality: The described machine learning system can accurately classify each page of the document into an appropriate document type, which can result in improved data quality and reduce the manual effort that would otherwise be required to review and correct errors in existing document processing systems. Further, the visual splitting neural network, title classifier, document classifier and identification extraction neural network allow for improved data extraction from the documents, enabling organizations to make more informed decisions based on the extracted data.

Improved Document Management: The described machine learning system's ability to automatically group sub-documents based on templates, document types, and identification numbers improves the overall management and organization of the documents. This helps to reduce time and computational resources needed to search for a document in a vast amount of documents.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a machine learning system implemented as computer programs on one or more computers in one or more locations that is configured to auto-split and classify an input document into one or more sub-documents. The machine learning system includes a visual splitting neural network, an optical character recognition (OCR) sub-system, a title classifier, a document classifier, an identification extraction neural network, and a grouper sub-system.

Generally, the input document is a collection of multiple sub-documents that are combined together. Each of these sub-documents can belong to any document type of a set of document types.

For example, in some implementations, the set of document types includes one or more of an invoice, a delivery note, a purchase order, or an email. For example, a 5-page input document may include tax invoices at pages 1 and 2, delivery notes at pages 3, and the remaining are purchase orders. As another example, a 300-page input document may include emails at pages 1-57, purchase orders at pages 58-137, deliver notes at pages 138-212, and the remaining pages are invoices.

In some other implementations, the set of document types includes one or more financial document types. For example, the set of document types includes one or more of a balance sheet, an income statement, a cash flow statement, a statement of owner's equity, an annual report, a quarterly report, a note to financial statements, or a text returns report.

In some other implementations, the set of document types includes one or more legal document types. For example, the set of document types includes one or more of an employment agreement, an independent contractor agreement, a non-disclosure agreement, a loan agreement, a consulting agreement, a partnership agreement, a corporate bylaws, an operating agreement, or a purchase and sale agreement.

In some other implementations, the set of document types includes one or more medical document types. For example, the set of document types includes one or more of a doctor note, a prescription, a vaccination record, a medical record, a discharge summary, a medical test result, an operative report, a consent form, or an email confirming an appointment.

The set of document types can be expanded based on header content and/or a title of the document.

Figure 1:
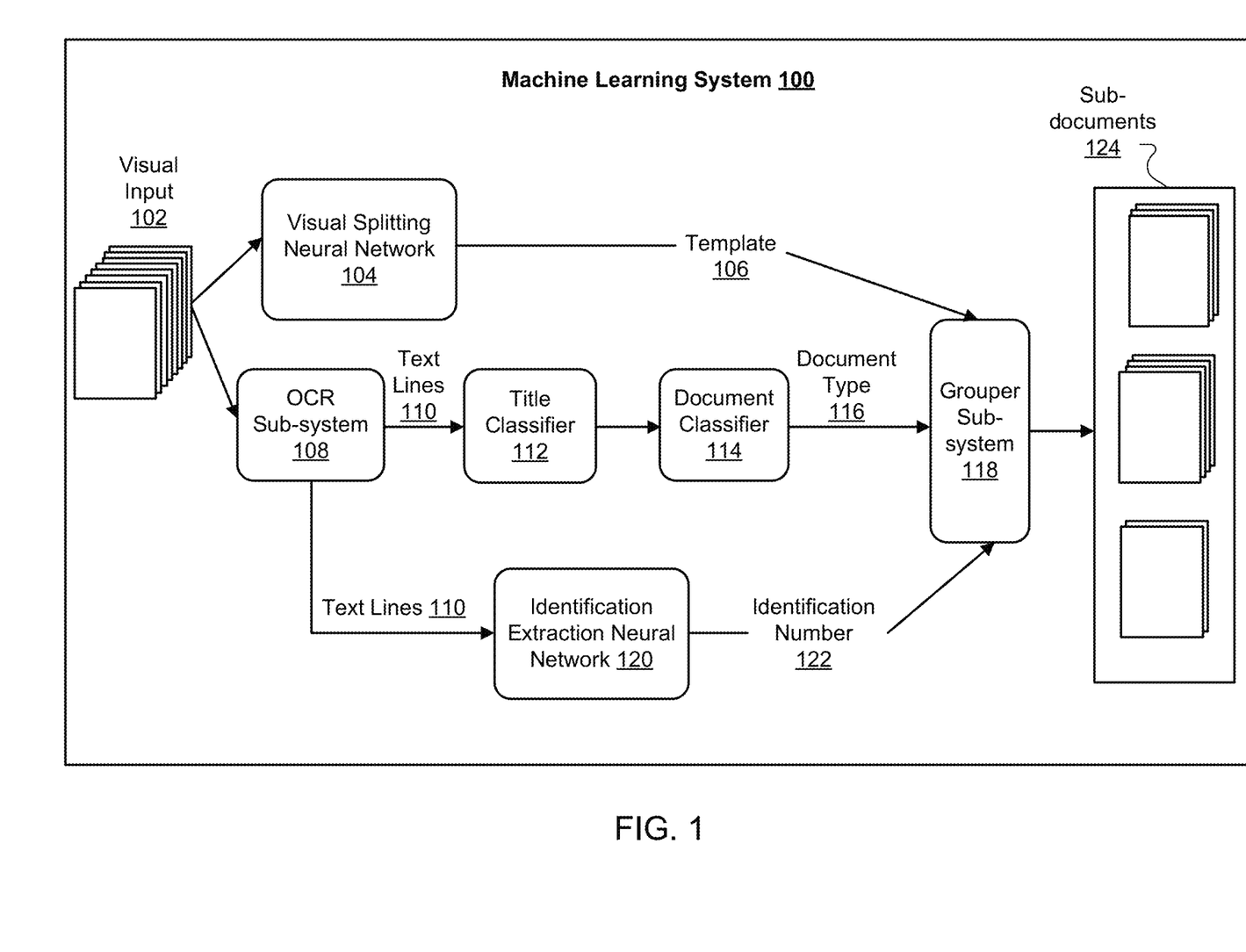
FIG. 1 shows an example machine learning system for auto-splitting and classifying a document.

FIG. 1 shows an example machine learning system 100 for auto-splitting and classifying a document. The system 100 is an example of a system implemented as computer programs on one or more computers in one or more locations, in which the systems, components, and techniques described below can be implemented. The machine learning system 100 includes a visual splitting neural network 104, an OCR sub-system 108, a title classifier 112, a document classifier 114, an identification extraction neural network 120, an a grouper sub-system 118.

To process an input document, the system 100 first receives a visual input 102 that represents multiple pages of the input document. For example, the visual input 102 can be a PDF file that is a combination of all scanned images of all pages of the input document.

The visual splitting neural network 104 is configured to classify each page in the visual input 102 into a respective template 106 in a set of templates. Each template can be used to generate different document types. Different templates have different visual appearance. Specifically, each template has one or more corresponding visual features including, but not limited to, a logo, a padding, a background, a header, a footer, a chart, and a font style.

The visual splitting neural network 104 is a convolutional neural network (CNN) that includes one or more convolutional neural network layers. The CNN has been trained on a document template recognition task. Generally, each of the one or more convolutional neural network layers include multiple artificial neurons. The artificial neurons are arranged into 2D or 3D grids which are called filters. Each filter extracts different types of features from input data. For example, from an image, one filter can extract edges, lines, circles, or more complex shapes.

To classify each page of the input document, the neural network 104 vertically combines the page with a previous page in the document to generate a joint 2-page input and provides this joint 2-page input to the one or more trained CNN layers. The one or more trained CNN layers extract a set of visual features from each page of the joint 2-page input and compare two sets of visual features to determine whether the page and the previous page have a same template. The one or more visual features may include a logo, a padding, a background, a header, a footer, a chart, or a font style.

Figure 5A:
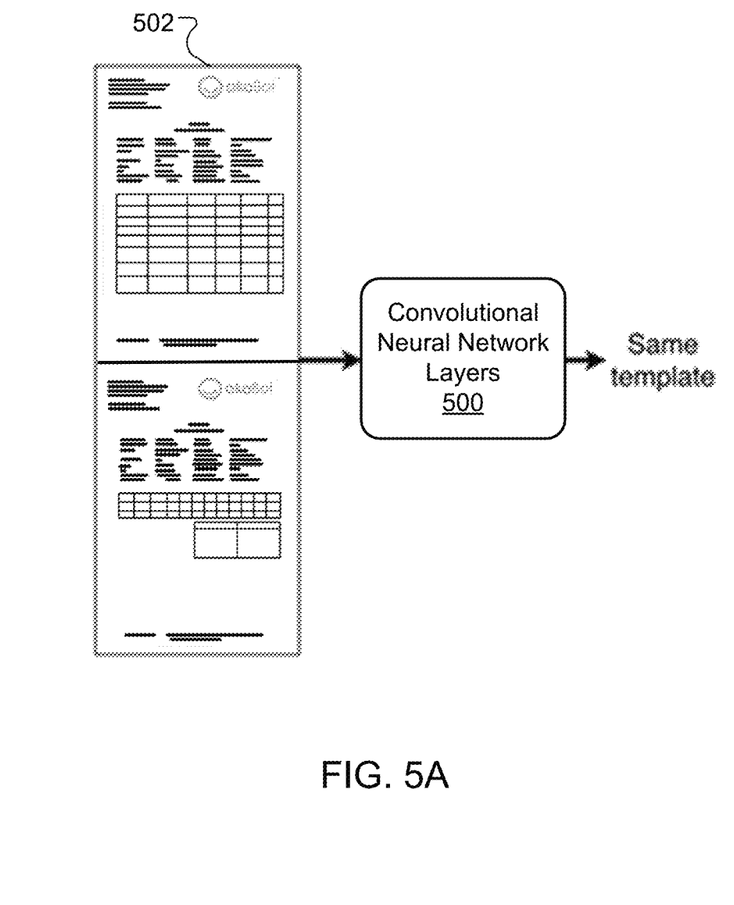
FIG. 5A and FIG. 5B illustrate an example process for determining whether two consecutive pages belong to the same template.
Figure 5B:
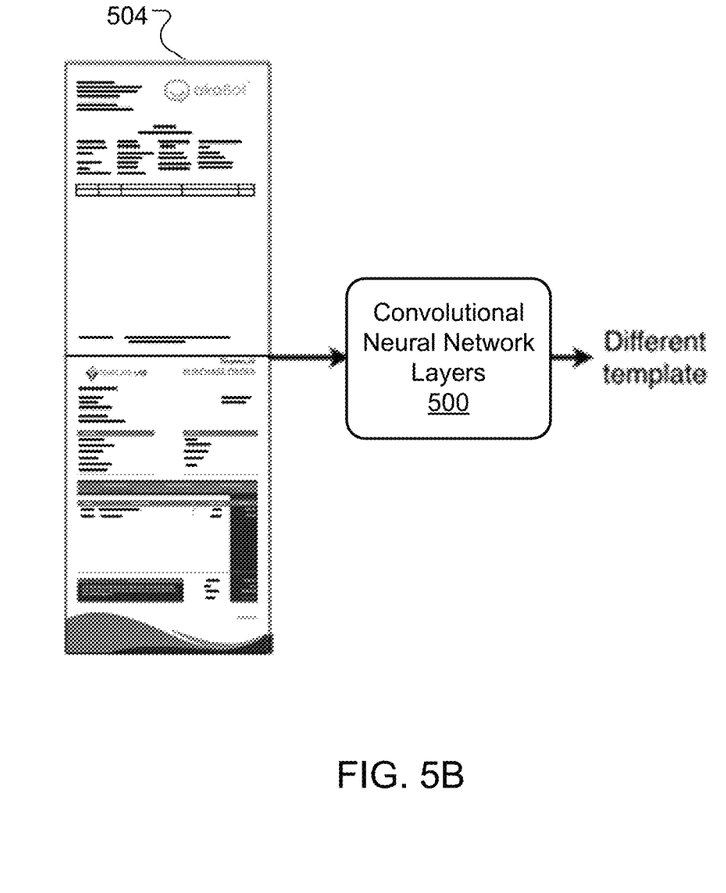

If the current page and the previous page have the same visual features, which means they have the same template, the one or more trained convolutional neural network layers associate the current page with a known template of the previous page. If the current page and the previous page have different visual features, which means they have a different template, the one or more trained convolutional neural network layers associate the current page with a new template. For example, as shown in FIG. 5A, the one or more convolutional neural network layers 500 of the neural network 104 processes a joint 2-page input 502 and determines that two pages in the input 502 belong to the same template. In contrast, FIG. 5B shows that the one or more convolutional neural network layers 500 processes a joint 2-page input 504 and determines that the two pages in the input 504 belong to two different templates.

Figure 2:
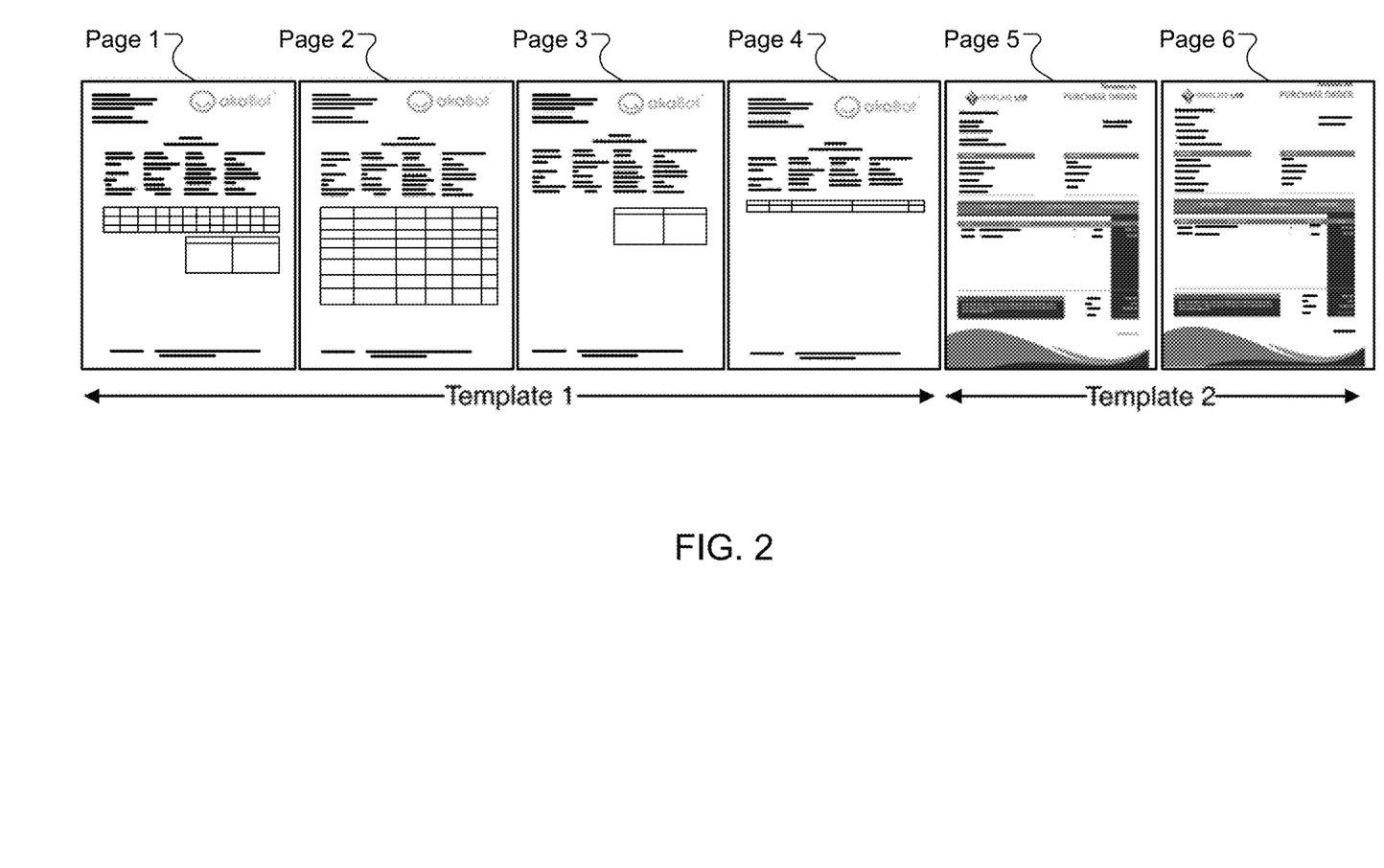
FIG. 2 illustrates an example of classifying each page of a document into a corresponding template.

The result of the process of classifying each page of the input document is illustrated in FIG. 2, where the visual splitting neural network 104 classifies, using the one or more trained convolutional neural network layers, pages 1-4 of the input document into Template 1 and pages 5 and 6 of the input document into Template 2. FIG. 2 illustrates a simplified implementation. In practice, the input document can have tens, hundreds, or thousands of pages.

The following set of operations are performed for each page of the input document.

For each page, the OCR sub-system 108 is configured to generate a set of text lines 110 from text content of the page. The title classifier 112 then processes each text line in the set of text lines to generate a corresponding confidence score that represents a probability that the text line includes a title of the page. The title classifier 112 is configured to select, based on the confidence scores of the set of text lines, a text line having the highest confidence score. In some implementations, the title classifier 112 is a Random Forest classifier. The process for generating confidence scores is described in more detail below with reference to FIG. 3.

The system 100 determines whether the highest confidence score exceeds a threshold. If the highest confidence score exceeds the threshold, which means the selected text line very likely includes a title, the system 100 processes the selected text line to determine a document type 116 of the page. In particular, the system 100 processes, using the document classifier 114, the selected text line to generate a respective document score for each document type in a set of document types. Each respective document score represents a probability that the page belongs to the document type. The system 100 selects the document type with the highest document score as a final document type 116 that the page belongs to.

Figure 4:
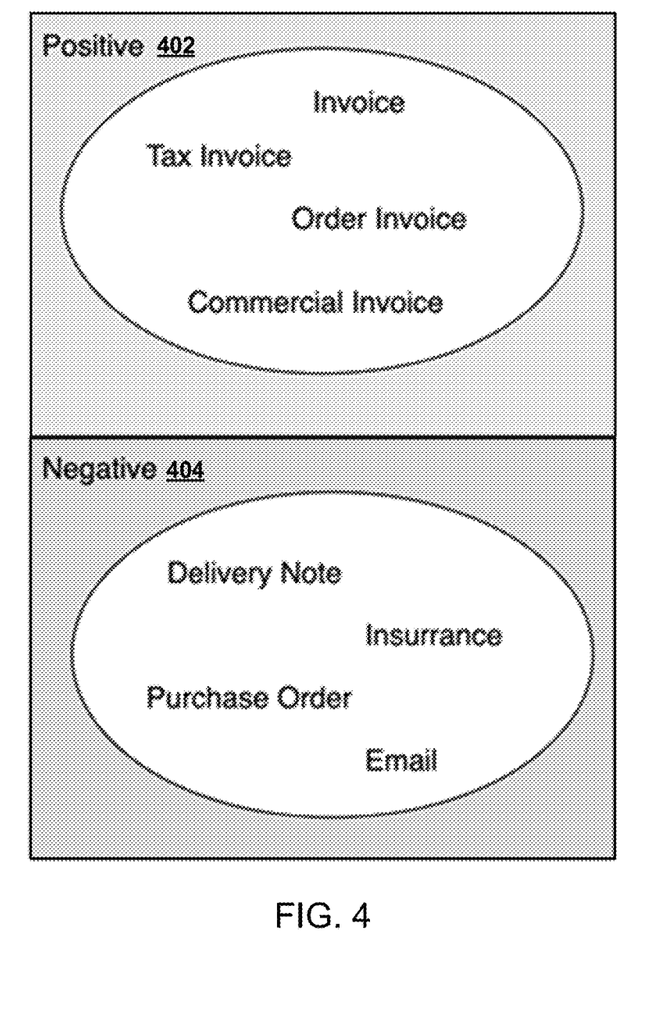
FIG. 4 illustrates an example of a positive set and a negative set of keywords representing document types.

More specifically, as shown in FIG. 4, the system maintains (i) a positive set of keywords 402 that represent document types that likely match the final document type of the page, and (ii) a negative set of keywords 404 that represent document types that unlikely match the final document type of the page. For example, for invoice classification, the positive set of keywords 402 may include "invoice," "tax invoice," "order invoice," and "commercial invoice," and the negative set of keywords 504 may include "delivery note," "insurance," "purchase order," and "email. " The document classifier 114 is configured to compute a respective document score for each keyword in the positive set of keywords 402 and the negative set of keywords 404. The document score for each keyword represents a probability that the page belongs to a document type represented by the keyword. The system 100 then selects the keyword that has the highest document score. This keyword specifies the final document type 116 that the page belongs to.

If the highest confidence score does not exceed the threshold, which means the selected text line unlikely includes a title, the system 100 processes, using the identification extraction neural network 120, each text line in the set of text lines to identify an identification number 122 of the page. An identification number can be, for example, an invoice number or a purchase number. In particular, the identification extraction neural network 120 extracts key information from each text line (e.g., by using a spatial dual-modality graph reasoning (SDMGR) method or a graph method) and identifies the identification number 122 of the page from the extracted key information.

In some implementations, the system 100 may determine identification number even when the selected text line likely includes a title.

Once the system 100 has determined a respective template of each page, a respective final document type of each page and optionally, a respective identification number of each page, the grouper sub-system 118 groups the pages of the input document represented by the visual input 102 into the one or more sub-documents 124 based on the respective template of each page, the respective final document type of each page and optionally, the respective identification number of each page.

The components of the machine learning system 100 are designed and trained to be robust to changes in document format, layout, and style. This means that the system 100 can still perform accurately even if the format of the document changes over time. In addition, the use of multiple templates and document types allows the machine learning system to learn and adapt to meet specific needs of organizations.

Figure 3:
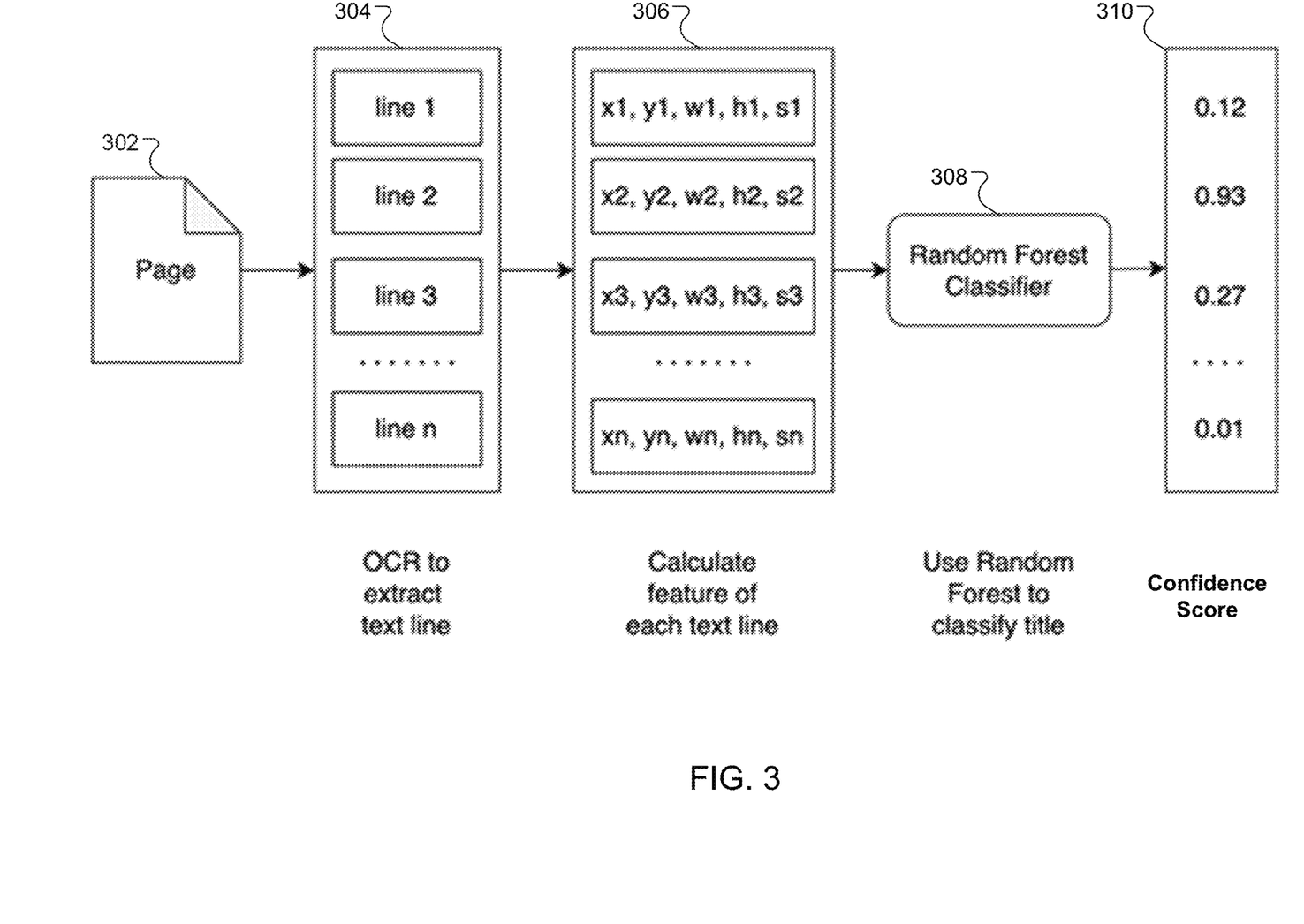
FIG. 3 shows an example process for processing a page to generate a confidence score for each text line of multiple text lines in the page.

FIG. 3 shows an example process for processing a page 302 to generate a confidence score for each text line of multiple text lines in the page 302. First, the OCR sub-system 108 is configured to extract multiple text lines 304 from text content of the page 302. In particular, the OCR sub-system is a neural network that has been trained to recognize text and extract text lines from a scanned image of a page. The OCR sub-system is trained to analyze the text over many levels (e.g., character level, word level, line level, etc.) and process the image repeatedly. It looks for different image attributes, such as curves, lines, intersections, and loops, and combines the results of all these different levels of analysis to get the final result which allows the OCR sub-system to recognize text, and extract text lines from the page 302.

The system 100 then calculates a set of features for each text line (306). For example, the set of features of each text line may include x coordinate, y coordinate, width w, height h of the text line, and a matching score. The system 100 computes a matching score for each text line by using a fuzzy matching method. In particular, for each text line and for each of a positive set of keywords and a negative set of keywords, the system 100 calculates a respective score for each keyword in that set, in which the respective score represents a probability that the text line includes the keyword. The system 100 selects the highest score among the respective scores as the matching score for the text line.

The system 100 provides the calculated features of all text lines to the title classifier 112 (which is a Random Forest classifier 408 in this example) as input. The Random Forest classifier 408 maintains a set of random trees (for example, N random trees with N being a positive integer greater than 2) for classifying whether each line of text includes a title. Each random tree selects a respective random set of features from the set of features. Based on the selected respective random set of features, each random tree computes a respective set of confidence scores that includes a corresponding confidence score for each text line, with each corresponding confidence score for each text line representing a probability that the text line includes a title. The Random Forest classifier computes a final confidence score for each text line by taking a weighted average of N corresponding confidence scores that N random trees computed for the text line. The final confidence score for each text line represents a final probability that the text line includes a title. The text line having the highest final confidence score most likely includes a title.

Figure 6:
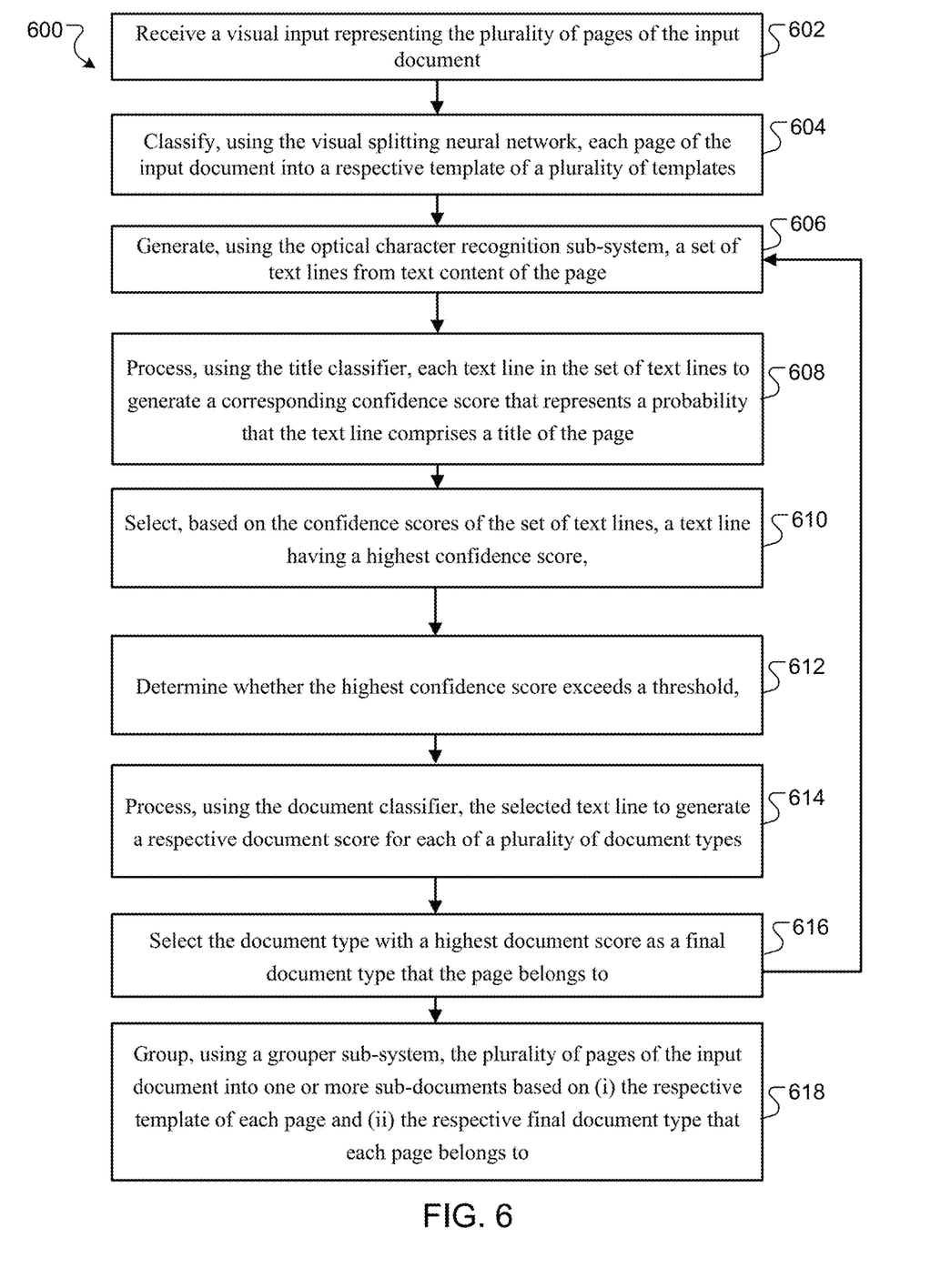
FIG. 6 is a flow diagram of an example process for processing an input document to split the input document into one or more sub-documents.

FIG. 6 is a flow diagram of an example process for processing an input document to split the input document into one or more sub-documents For convenience, the process 600 will be described as being performed by a system of one or more computers located in one or more locations. For example, a machine learning system, e.g., the machine learning system 100 of FIG. 1, appropriately programmed in accordance with this specification, can perform the process 600.

The system receives a visual input representing a plurality of pages of the input document (step 602). The visual input can be a PDF file that is a combination of all scanned images of all pages of the input document.

The system classifies each page of the input document into a respective template of a plurality of templates (step 604). Each template can be used to generate different document types. Different templates have different visual appearance. Specifically, each template has one or more corresponding visual features including, but not limited to, a logo, a padding, a background, a header, a footer, a chart, and a font style.

To classify each page of the input document, the system combines the page with a previous page in the document vertically to generate a joint 2-page input and provides this joint 2-page input to one or more trained CNN layers. The one or more trained CNN layers extract one or more visual features from the joint 2-page input and compare them to determine whether the page and the previous page have a same template. If the page and the previous page have a same template, the one or more trained convolutional neural network layers associate the page with a known template of the previous page. If the page and the previous page have a different template, the one or more trained convolutional neural network layers associate the current page with a new template.

For each page of the input document, the system performs steps 606-616 as follows.

The system generates a set of text lines from text content of the page using the optical character recognition technique (step 606).

The system processes each text line in the set of text lines to generate a corresponding confidence score that represents a probability that the text line comprises a title of the page (step 608). For example, the system extracts features of each text line and provides the extracted features to a Random Forest classifier as input. The system then processes, using the Random Forest classifier, the extracted features to generate a corresponding confidence score for each text line using a random forest classifying method.

The system selects, based on the confidence scores of the set of text lines, a text line having a highest confidence score (step 610).

The system determines whether the highest confidence score exceeds a threshold (step 612).

In response to determining that the highest confidence score exceeds the threshold, the system processes, using the document classifier, the selected text line to generate a respective document score for each of a plurality of document types (step 614). Each respective document score represents a probability that the page belongs to the document type.

The system selects the document type with a highest document score as a final document type that the page belongs to (step 616).

In particular, in some implementations, the system maintains (i) a positive set of keywords representing document types that likely match the final document type of the page, and (ii) a negative set of keywords representing document types that unlikely match the final document type of the page. The system computes a respective document score for each keyword in the positive set of keywords and the negative set of keywords. The system selects the keyword that has the highest document score. The selected keyword specifies the final document type that the page belongs to.

In response to determining that the highest confidence score does not exceed the threshold, the system processes each text line in the set of text lines to identify an identification number of the page. In particular, the system extracts key information in each text line, and identifies the identification number of the page from the extracted key information. In some implementations, the system extracts the key information from each text line by using spatial dual-modality graph reasoning (SDMGR) method or graph method.

The system groups, using a grouper sub-system, the plurality of pages of the input document into one or more sub-documents based on (i) the respective template of each page, and (ii) the respective final document type of each page and/or (ii) the respective identification number of each page (step 618). By grouping the plurality of pages into one or more sub-documents, the system has successfully split the input document into one or more sub-documents.

The system may display the one or more sub-documents on a user interface of the system. Alternatively or in addition, the system may transmit the one or more sub-documents to a computing device of a user of the system. Further, the system may store the one or more sub-documents in proper locations in one or more data storages. The one or more data storages can be available locally or on one or more cloud computing systems.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for auto-splitting and classifying an input document into one or more sub-documents using a machine learning system, wherein the input document comprises a plurality of pages, and wherein the machine learning system comprises a visual splitting neural network, an optical character recognition sub-system, a title classifier, a document classifier, and a grouper sub-system, the method comprising:
receiving a visual input representing the plurality of pages of the input document;
classifying, using the visual splitting neural network, each page of the input document into a respective template of a plurality of templates;
for each page of the input document, performing the following operations:
generating, using the optical character recognition sub-system, a set of text lines from text content of the page,
processing, using the title classifier, each text line in the set of text lines to generate a corresponding confidence score that represents a probability that the text line comprises a title of the page,
selecting, based on the confidence scores of the set of text lines, a text line having a highest confidence score,
determining whether the highest confidence score exceeds a threshold,
in response to determining that the highest confidence score exceeds the threshold, processing, using the document classifier, the selected text line to generate a respective document score for each of a plurality of document types, with each respective document score representing a probability that the page belongs to the document type, and
selecting the document type with a highest document score as a final document type that the page belongs to; and
grouping, using a grouper sub-system, the plurality of pages of the input document into one or more sub-documents based on (i) the respective template of each page and (ii) the respective final document type that each page belongs to.

2. The method of claim 1, wherein the machine learning system further comprises an identification extraction neural network,
wherein for each page of the input document, in response to determining that the highest confidence score does not exceed the threshold, processing, using the identification extraction neural network, each text line in the set of text lines to identify an identification number of the page, and
wherein grouping, using the grouper sub-system, the plurality of pages of the input document into the one or more sub-documents is further based on the identification number of the page.

3. The method of claim 2, wherein for each page of the input document, in response to determining that the highest confidence score does not exceed the threshold, processing, using the identification extraction neural network, each text line in the set of text lines to identify the identification number of the page comprises:
extracting, using the identification extraction neural network, key information in each text line, and
identifying, using the identification extraction neural network, the identification number of the page from the extracted key information.

4. The method of claim 3, wherein extracting key information in each text line comprises:
extracting key information using spatial dual-modality graph reasoning (SDMGR) method or graph method.

5. The method of claim 1, wherein the visual input is a PDF file.

6. The method of claim 5, wherein each page of the PDF file is a scanned image.

7. The method of claim 1, wherein different templates of the plurality of templates have different visual appearance.

8. The method of claim 1, wherein each of the plurality of templates is used to generate different document types, wherein each template has one or more visual features, the one or more visual features comprising a logo, a padding, a background, a header, a footer, a chart, or a font style.

9. The method of claim 1, wherein the plurality of document types comprises an invoice, a delivery note, a purchase order, an insurance policy, and an email.

10. The method of claim 1, wherein classifying, using the visual splitting neural network, each page of the input document into a respective template of the plurality of templates comprises:

combining the page with a previous page in the document vertically to generate a joint 2-page input for the visual splitting neural network, wherein the visual splitting neural network comprises one or more trained convolutional neural network layers;

processing, using the one or more trained convolutional neural network layers, the joint 2-page input to determine whether the page and the previous page have a same template, and in response to determining that the page and the previous page have a same template, associating the page with a known template of the previous page, or in response to determining that the page and the previous page have a different template, associating the current page with a new template.

11. The method of claim 10, wherein processing, using the visual splitting neural network, the joint 2-page input to determine whether the page and the previous page have the same template comprises:

extracting one or more visual features from the joint 2-page input using the one or more trained convolutional neural network layers, the one or more visual features comprising a logo, a padding, a background, or a font style.

12. The method of claim 1, wherein the title classifier is a Random Forest classifier.

13. The method of claim 12, wherein processing, using the title classifier, each text line in the set of text lines to generate the corresponding confidence score comprises:

extracting features of each text line and providing the extracted features to the Random Forest classifier as input;

processing, using the Random Forest classifier, the extracted features to generate a corresponding confidence score for each text line using a random forest classifying method.

14. The method of claim 13, wherein the features of each text line includes x coordinate, y coordinate, width w, height h of the text line, and a matching score.

15. The method of claim 1, wherein for each page of the input document, in response to determining that the highest confidence score exceeds the threshold, processing, using the document classifier, the selected text line to generate a respective document score for each of a plurality of document types comprises:

maintaining (i) a positive set of keywords representing document types that likely match the final document type of the page, and (ii) a negative set of keywords representing document types that unlikely match the final document type of the page, and computing a respective document score for each keyword in the positive set of keywords and the negative set of keywords, and wherein selecting the document type with the highest document score as a final document type that the page belongs to comprises: selecting the keyword that has the highest document score, the keyword specifying the final document type that the page belongs to.

16. A system comprising one or more computers and one or more storage devices storing instructions that, when executed by the one or more computers, cause the one or more computers to perform operations for auto-splitting and classifying an input document into one or more sub-documents using a machine learning system, wherein the input document comprises a plurality of pages, and wherein the machine learning system comprises a visual splitting neural network, an optical character recognition sub-system, a title classifier, a document classifier, and a grouper sub-system, the operations comprising:

receiving a visual input representing the plurality of pages of the input document;

classifying, using the visual splitting neural network, each page of the input document into a respective template of a plurality of templates;

for each page of the input document, performing the following operations:

generating, using the optical character recognition sub-system, a set of text lines from text content of the page, processing, using the title classifier, each text line in the set of text lines to generate a corresponding confidence score that represents a probability that the text line comprises a title of the page, selecting, based on the confidence scores of the set of text lines, a text line having a highest confidence score, determining whether the highest confidence score exceeds a threshold, in response to determining that the highest confidence score exceeds the threshold, processing, using the document classifier, the selected text line to generate a respective document score for each of a plurality of document types, with each respective document score representing a probability that the page belongs to the document type, and selecting the document type with a highest document score as a final document type that the page belongs to; and grouping, using a grouper sub-system, the plurality of pages of the input document into one or more sub-documents based on (i) the respective template of each page and (ii) the respective final document type that each page belongs to.

17. The system of claim 16, wherein the operations further comprise:

for each page of the input document, in response to determining that the highest confidence score does not exceed the threshold, processing each text line in the set of text lines to identify an identification number of the page, and wherein the operations for grouping, using the grouper sub-system, the plurality of pages of the input document into the one or more sub-documents is further based on the identification number of the page.

18. The system of claim 16, wherein the visual input is a PDF file with each page of the PDF file being a scanned image.

19. One or more non-transitory computer storage media storing instructions that, when executed by one or more computers, cause the one or more computers to perform operations for auto-splitting and classifying an input document into one or more sub-documents using a machine learning system, wherein the input document comprises a plurality of pages, and wherein the machine learning system comprises a visual splitting neural network, an optical character recognition sub-system, a title classifier, a document classifier, and a grouper sub-system, the operations comprising:

receiving a visual input representing the plurality of pages of the input document;

classifying, using the visual splitting neural network, each page of the input document into a respective template of a plurality of templates;

for each page of the input document, performing the following operations:
- generating, using the optical character recognition sub-system, a set of text lines from text content of the page,
- processing, using the title classifier, each text line in the set of text lines to generate a corresponding confidence score that represents a probability that the text line comprises a title of the page,
- selecting, based on the confidence scores of the set of text lines, a text line having a highest confidence score,
- determining whether the highest confidence score exceeds a threshold,
- in response to determining that the highest confidence score exceeds the threshold, processing, using the document classifier, the selected text line to generate a respective document score for each of a plurality of document types, with each respective document score representing a probability that the page belongs to the document type, and
- selecting the document type with a highest document score as a final document type that the page belongs to; and
- grouping, using a grouper sub-system, the plurality of pages of the input document into one or more sub-documents based on (i) the respective template of each page and (ii) the respective final document type that each page belongs to.

20. The one or more non-transitory computer storage media of claim 19, wherein the operations further comprise:
- for each page of the input document, in response to determining that the highest confidence score does not exceed the threshold, processing each text line in the set of text lines to identify an identification number of the page, and
- wherein the operations for grouping, using the grouper sub-system, the plurality of pages of the input document into the one or more sub-documents is further based on the identification number of the page.

* * * * *